May 29, 1962 R. H. DICKE 3,036,384
CLOTHES DRYERS
Filed Nov. 26, 1958 3 Sheets-Sheet 2
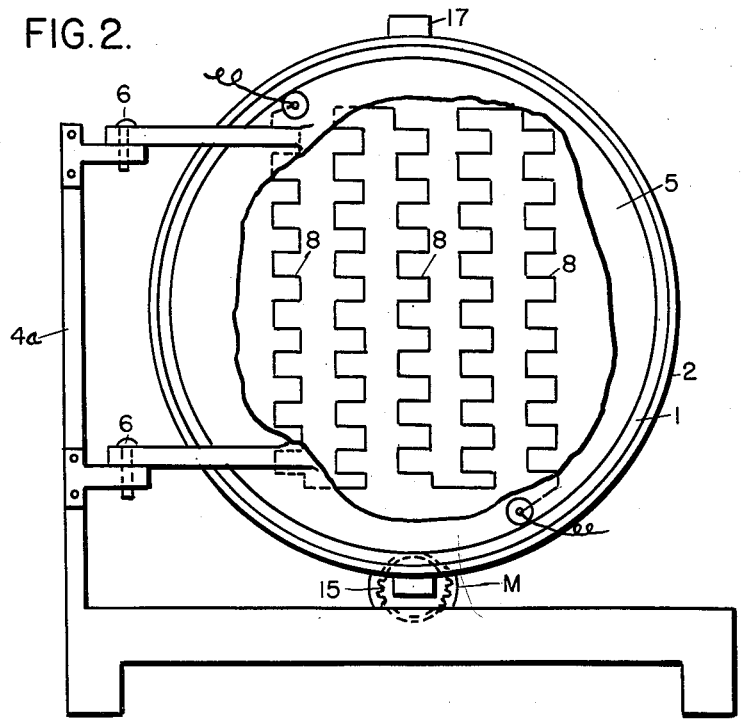
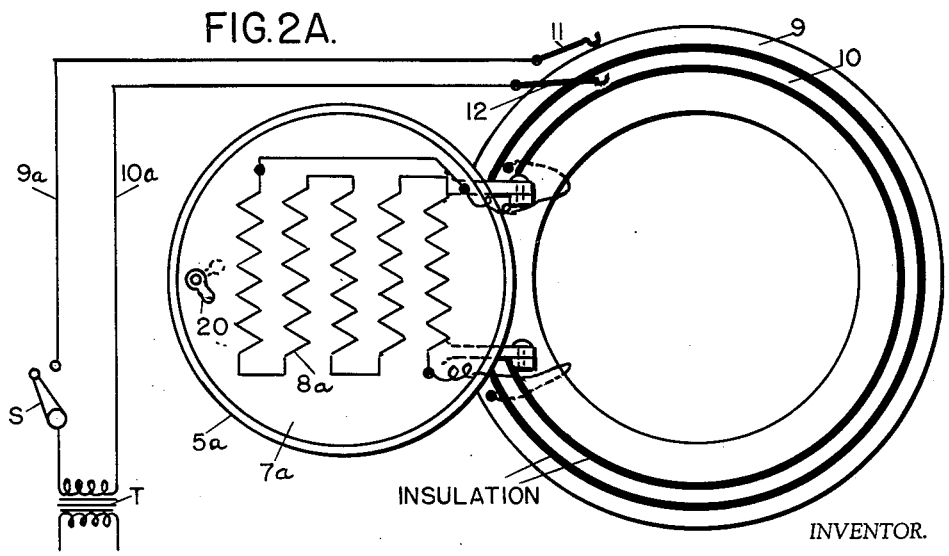
INVENTOR.
ROBERT H. DICKE
BY
Oscar H. Dicke
HIS ATTORNEY

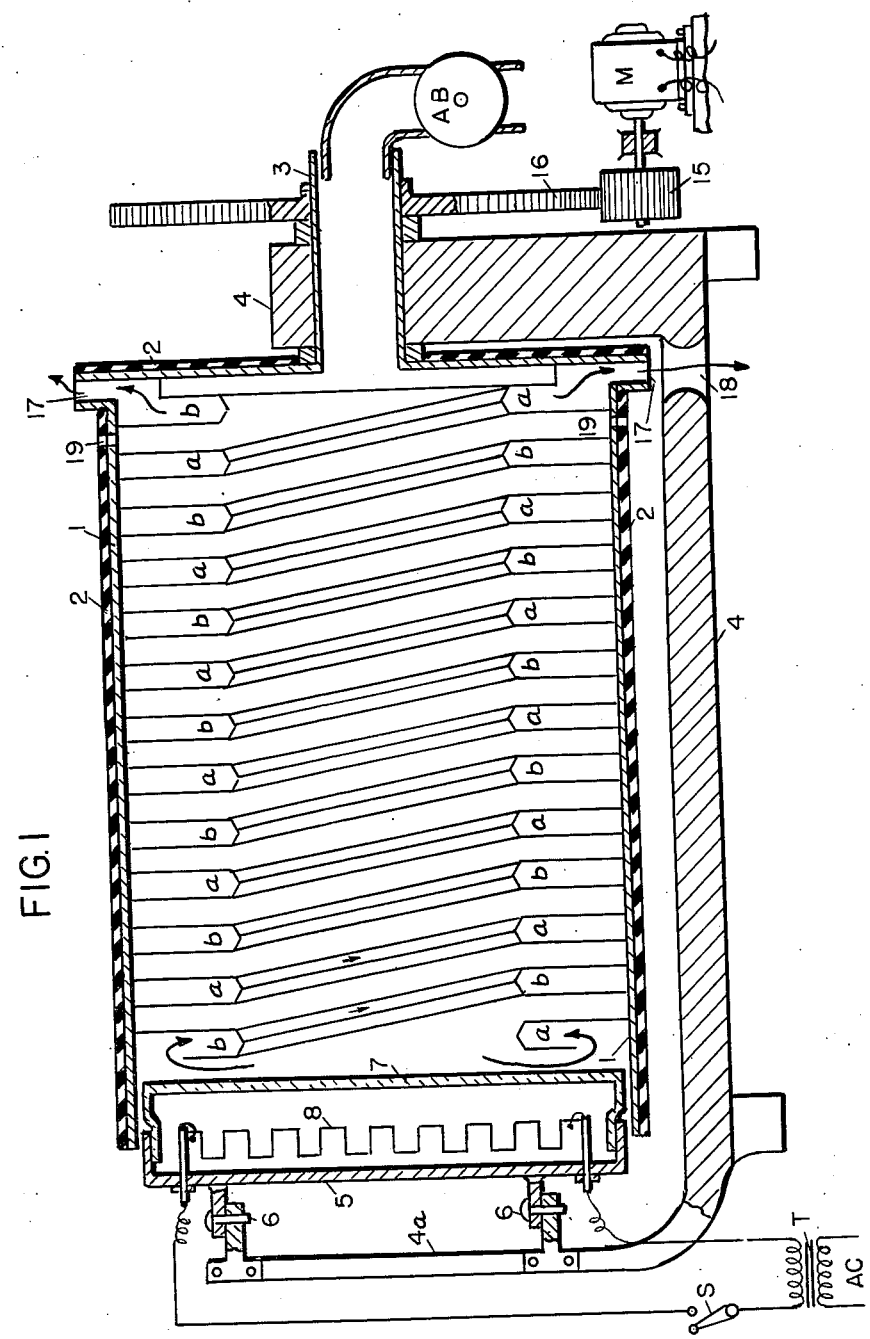

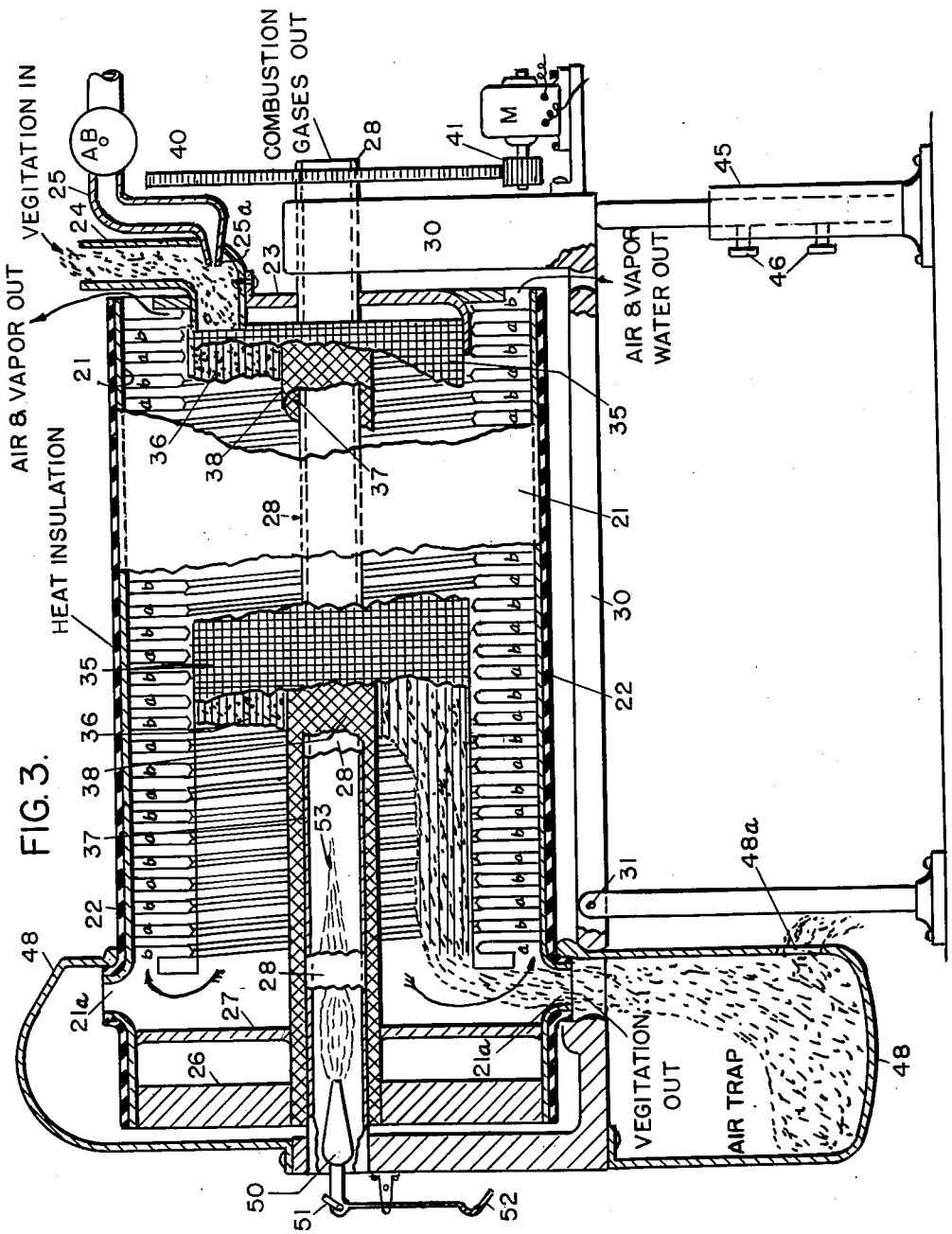

United States Patent Office 3,036,384
Patented May 29, 1962

3,036,384
CLOTHES DRYERS
Robert H. Dicke, 37 Jefferson Road, Princeton, N.J.
Filed Nov. 26, 1958, Ser. No. 776,513
25 Claims. (Cl. 34—76)

This invention relates to domestic and commercial clothes and vegetation dryers and more particularly to a construction which economizes in the expenditure of fuel and heat energy during quick as well as slower clothes and other material drying procedure.

It is well known that the heat of vaporization, the heat required to change water to water vapor, and the heat of condensation, the heat given up during condensation of such vapor, is very large, but the development of a structure to take advantage of the heat of condensation in a clothes or vegetation dryer is not so apparent.

In view of the foregoing and other important considerations, it is proposed in accordance with the present invention to so arrange the location of the heater, the direction of air flow and the direction of rotation of a chamber in which wet or moist clothes or vegetation has been placed that the vapor driven off of a portion of the clothes or other material will condense in a chamber which is in good heat conducting relationship with colder air, clothes or material, so that this vapor will condense and give up a substantial quantity of heat which will, by reason of this good heat conduction, be conducted to such colder air and clothes to in turn cause a second evaporation of water, the heat of condensation of this second evaporation being used to produce a third evaporation, etc., and the resulting water of condensation resulting from each evaporation will be drained off without getting into contact with any of the clothes or other material to be dried.

More specifically, it is proposed to employ a rotating vessel having a double wall, the inner wall of which is constructed of heat conduction corrugated or otherwise crumpled material, such as aluminum or stainless steel, which is extremely thin so as to freely conduct heat from one side to the other, and the outer wall of which vessel is well heat insulated. The inner chamber of this vessel contains the clothes or vegetation to be dried. Air is blown in one end of the inner sub-chamber and allowed to return between the two walls, conveniently called an outer sub-chamber, provision being made for heating the other end of the main chamber so that the return air flow through the outer sub-chamber contains a large amount of hot vapor. This vapor during its return between the two walls of the vessel or through the outer sub-chamber, and by reason of the thin large area good heat conducting inner wall will condense and the heat of condensation passes through this thin wall to the colder moist contents of the inner sub-chamber, at a successively lower temperature namely constitutes a temperature gradient. In this way the same heat may be used several times in as many cycles.

In another form of the invention, it is proposed to employ an arrangement of parts such that the material to be dried, clothes or vegetation, flows continuously through the dryer, flowing in moist and flowing out substantially dry, and wherein the same heat is used two or more times as above explained.

Other objects, purposes and characteristic features of the invention will become apparent as this specification is studied in the light of the accompanying drawings in which:

FIG. 1 shows a cross-sectional elevation taken substantially through the axis of rotation of a clothes dryer, embodying the present invention;

FIG. 2 shows an end-view of the clothes dryer of FIG. 1 as viewed from the left, illustrating particularly the door and electric heater element;

FIG. 2a shows a modified form of the end shown in FIG. 2 in which the heater rotates with the container and in which the electric current is conducted thereto through slip-rings; and FIG. 3 shows a cross-sectional elevation of a continuous process dryer, illustrated as a chopped vegetation dryer, but which may also be used as a clothes dryer.

*FIG. 1 Structure.*—By referring to FIG. 1, it will be seen that a cylindrical drum 1, covered by heat insulating material 2, and having coaxially projecting therefrom a hollow shaft 3 which is pivoted in a bearing constituting a portion of the main frame 4. This frame 4 is preferably provided with an upstanding portion 4a, to which a door 5 is hinged by hinges 6. A cover 7 of good heat transmitting material, such as glass or metal, is provided. This cover 7 may constitute part of the chamber 1 and rotates therewith and may be removable or openable, or may constitute part of the main door 5. The structure is such that the door 5 and cover 7 may be opened to allow the clothes to be placed in or removed from the central portion of the drum 1. An electric heating element, or resistance unit 8, is provided to aid in the heating and drying of the clothes or other material, although a certain amount of drying would be accomplished without such heat. This heater 8 has been shown supported on the door 5 although it may be supported by the cylinder 1, in which case slip rings 9 and 10 will be provided to conduct electric current to the element as shown in FIG. 2A. These slip rings 9 and 10 are engaged by brushes 11 and 12 connected by wires 9a and 10a and switch S to the transformer T or other source of electric current. When this latter construction is used the frame extension 4a may be dispensed with and the door 5 may be hingedly or removably fastened directly to the drum 1.

The inside of the cylindrical drum 1 has secured thereto one or more hollow spiral threads, two having been shown, and designated a and b made of thin heat conducting material such as aluminum or stainless steel, extending each, as shown, for six complete turns around the inside of and through the drum 1. These threads a and b are hollow and are air and water tight except that both ends of both threads are open, as shown by arrows, illustrating the flow of air and vapor into them at the left end and the flow of air, water and possibly some vapor out of the threads at the right end. The space within these hollow threads may for convenience be designated the outer sub-chamber, whereas the material of the threads may be called the partition.

It will be seen from FIG. 1 that a motor operated air blower AB is provided with a nozzle-like extension to blow air into and through the hollow shaft 3 and into the right hand end of the inner sub-chamber of the drum 1. It should also be noted that a motor M may, through the medium of pinion 15, and gear 16, rotate the drum 1 at a slow speed and in a clock-wise direction, as viewed from the left. This is done in order to tumble the clothes and also to cause flow of water in the hollow threads a and b from the left toward the right and out of the open ends of these threads a and b at the right end, which are connected to openings 17. Any water that may get between these hollow threads a and b may, even though the air therebetween flows in a counter-clockwise direction about the axis of the drum, also flow out of the right hand end of the drum in that these slots between threads are drained at the right-hand end as by small openings 19. This flow of water is toward the right because the screw threads a and b propel the water toward the right during rotation of the drum.

*Operation.*—Let us assume that the door 5 is opened with, or separately from, the cover 7, but that both door and cover are opened. Clothes that are fairly hot and wet are put within the container 1—2, *a—b*. The door 5—7 is now closed and the motor M is started as is also a second motor constituting part of the air-blower AB. The clothes are now tumbled as the drum 1 is rotated clock-wise as viewed from the left end. The dry air blowing through and over the warm wet clothes causes vapor to blow off of the clothes and into the left ends of the hollow threads *a* and *b*. As this vapor flowing left to right through the outer sub-chamber strikes the inner walls of the threads *a—b*, it will condense and the heat of condensation will flow through the thin good heat conducting metal of the large surface threads *a—b* and into the cool clothes which have, by this time, been cooled, at least to a small extent. The water so formed will be screwed, so-to-speak, toward the right and will drop out of the openings 17 and 18. It is believed that clothes would be partially dried rather slowly until the clothes cool off, namely when the dryer of FIG. 1 is used as just explained, that is, without added heat.

It is now assumed that the same procedure is repeated, except for the fact that now the switch S is also closed when the motor M and the blower AB are started. In this case, a large amount of heat will be radiated from the resistance unit 8 and through the glass 7 into the clothes from the left end, which thereby heats the clothes to a considerably high temperature. As these very hot clothes are struck by air moving right to left through, and by, the clothes, very hot moisture flows into the hollow threads *a* and *b* and a large amount of vapor contained in this air will condense along the entire length of the hollow threads *a* and *b*, by reason of the fact that condensation depends on the temperature difference between the vapor and the sheet metal constituting these hollow threads, and since this metal, and the clothes contained therein, have a gradient temperature starting with very hot or warm at the left and cold at the right and since the vapor and air flowing in the outer sub-chamber, that is, through these threads also has a falling temperature gradient from left to right by reason of the fact that heat is given off as this flow through the teeth or threads *a* and *b* proceeds and causes part of the vapor to turn to water, condensation takes place within these threads throughout their entire length. The structure is preferably such, that is, one, two, three or more screw threads *a*, *b* etc. are used in multiple to cause the temperature drop in the metal of the threads and the air and vapor in the hollow of the threads to have substantially the same temperature gradient, but of a substantially constant temperature difference, to result in a substantially constant temperature drop from left to right through the container 1—2, *a—b*. Such a more or less uniform temperature drop or gradient results in very efficient use of the heat applied.

Another feature of the structure just described is that the apparent movement of the threads *a—b* toward the right, due to turning of the drum, causes the lower part of the clothes to be moved toward the right and the blowing of the air from right to left causes the clothes to blow toward the left at the top so that the clothes acually tumble or roll over and over as the operation continues.

If the heating element is supported on the left hand inner side of the drum 1 then the electric current is supplied through wires 9a and 10a and slip rings 9 and 10, as shown in FIG. 2A. In such modified form, the operation is exactly the same as that described except that the heater 8, glass 7a and the door 5 are rotated with the drum 1. The door 5a must not be opened except when the drum 1 assumes the correct position and when it is reclosed it may be latched by latch 20.

*Structure FIG. 3.*—In FIG. 3 has been illustrated a continuous process clothes or vegetation dryer. In this disclosure, the drum 21 is considerably longer and is pivoted to a tiltable frame 30 so that the right hand end of the drum may be lifted to cause gravity to aid in the flow of clothes or vegetation from right to left through the hollow of the drum 21. This drum 21 is covered by heat insulating material 22. The right hand end of the drum is entirely open insofar as rotating elements are concerned but is closed for air flow by a shield 23, a vegetation inlet pipe 24 and an air inlet flow pipe 25. The left hand end of the drum 21 preferably has two solid discs or wheels 26 and 27 to support the same, which are in turn firmly secured to a hollow shaft 28 pivoted at its two ends in frame 30. This is resorted to to give added strength since the right hand end is preferably not bearing supported, although it may be bearing supported as shown. The frame 30 is pivoted at its left end, at pivot 31, so that the drum 21 may be tilted toward the left by bringing the right hand end up. This in order to aid the flow of vegetation through the dryer or dehydrator. This tilting is permitted by using flexible tubes 24 and 25 instead of rigid tubes.

The inside wall has secured thereto two hollow threads *a* and *b* that extend for fourteen and one-half turns through the cylinder 21, similar to those shown in FIG. 1. Any number of such threads, in multiple, may be used, and they may extend for any number of turns within practicable limits. These threads are open at both ends as heretofore described in connection with FIG. 1, and are used to allow the air, vapor and water to be returned from left to right out of the drum, similar to the manner in which air, vapor and water are caused to flow left to right in FIG. 1. The drum 21 should not be raised so high, as compared with the speed of rotation of drum 21, that water will accumulate tooth high or thread high within the thread, for if this would occur air and vapor flow through such hollow thread would be blocked. In this connection, it is understood that water is not present in the hollow threads near the left hand end since condensation will not occur, for instance in the first turn, at the left end. In order to keep chopped corn or grass from falling between these threads *a—b*, a screen, the outside of which has been shown at 35 and the inside of which is shown at 36, is provided. Also, to keep the chopped material away from the hot hollow shaft 28, a screen, the inside of which is shown at 37 and the outside of which is shown at 38, is provided.

A burner of fuel nozzle 50 having a valve 51 and fed by a fuel hose 52 is provided. The hose is employed to afford flexibility when the dryer is adjusted about pivot 31. This burner 50 shoots a flame 53 into the hollow shaft 28 to cause extreme heating at the left end of shaft 28 and to cause much less heating at the right hand end of shaft 28.

At the extreme right hand end of hollow shaft 28 is a drive gear 40, driven by a pinion 41, contained on the shaft of a motor M. The speed of the motor M and the gear ratio of gear train 40—41 is such that the drum 21 rotates very slowly and at the proper speed to cause proper drying of the material to be dried or dehydrated and to cause the water to flow out. The right hand end of the frame 30 may rest on a support 45, which is preferably telescopic, so its height may be varied and the adjustment held, as by set screws 46. Air may be forced into the stream of chopped hay, or the like, as it enters the dryer as by an air blower AB, through a pipe 25 terminating in a nozzle 25a as shown, entering into the side of the larger pipe 24, which brings the chopped hay into the rotating cylinder 21. The left hand end of the rotating drum is provided with an air-trap 48 which allows the chopped hay or vegetation to be removed without allowing the air to blow out at that end, in that the air and the vapor it contains should return left to right through the hollow threads *a—b* constituting an outer sub-chamber, so that the heat of vaporization of the vapor upon its condensation within these threads may return to the inside of the cool end of the drum 21, to cause a second evaporation. This air, water and vapor may blow or flow out of the right hand end of the threads a—b. It is readily seen that if the water accumulation in the hollow threads a—b is small, as it will be, and if the rotation of the drum 21 and its thread a—b and its screens 35—36 and 37—38 is fast enough to prevent a complete turn of a spiral from filling up with water, this water will be pumped out of the right hand end of the spiral a—b, even though the right hand end has been lifted more than forty-five degrees, because the water in any one turn cannot run toward the left end during rotation of the drum 21 in a clock-wise direction as viewed from the left, but will instead run out of the right hand end.

For certain types of material to be dried, it may be desirable to cause the material to move through the drying tube or drum 21 in a direction opposite to the direction to that of the air flow through the material. This can be accomplished by moving the burner 50 to the right hand end of the combustion tube 28, and blowing only enough air with the nozzle 25a to inject the material to be dried. The main drying air stream would be injected through the air trap or housing 48 by an orifice not shown. It is also necessary to interchange the entrance and discharge ends of the threads a and b. Namely the entrance of air and vapor into these threads should, in this case, be at the right side of the figure with the water and air discharge occurring at the left side through an outlet not shown. Another way of accomplishing this is to reverse the direction of flow of the material to be dried through the machine.

*Operation of FIG. 3.*—Let us assume that the burner nozzle 50 has been lighted and that the air trap 48 is filled to an extent above the outlet opening 48a. Let us also assume that the right hand end of the frame 30 has been lifted to an extent of, say, twenty degrees, that the motor M has been started and rotates the drum 21 in a clock-wise direction as viewed from the left and that chopped green hay feeds in through the pipe 24, and that the air blower AB blows air out of the nozzle end 25a of the pipe 25. As this green chopped hay moves toward the left, by reason of the tilted condition of the drum 21 and rotation of this drum and the screen 35—36, the hay will be heated to an extent to cause vapor to rise therefrom. Since this air and vapor is forced toward the left in the inner sub-chamber by blower AB and cannot leave the left end of the drum 21, this air will return through the outer sub-chamber consisting of hollow threads a and b toward the right hand end of the cylinder. The vapor will, however, not return the full length in that by reason of the cold hay and cold air at the right hand end substantially all the vapor will condense into water, which will by the rotation of the drum 21 and its threads a—b be pumped, so-to-speak, out of the right hand end. This condensation of the vapor into water will give off its heat of vaporization, which may also be called heat of condensation. This heat will conduct through the thin walls of the threads a—b and into the cold chopped hay. It is thus seen that the same heat will be used twice, or oftener, in vaporizing moisture out of the chopped hay. This chopped hay, after it has been thoroughly dried, will drop out of openings 21a and into the air trap 48, from which it may be removed through opening 48a manually, or by other means, not shown. The flue gasses from the flame 53 may pass out of the right hand end of hollow shaft 28.

This apparatus may in like manner be used for drying clothes, chopped corn and other vegetation.

Having thus shown and described several forms of the invention, it should be understood that this has been done to show the nature of the invention rather than its scope, and it should be understood that many other structures may be used to accomplish a similar result and that various changes, modifications and additions may be made without departing from this invention so long as these changes come within the scope of the following claims.

What I claim is:

1. A dryer comprising; a housing consisting of walls to form a main chamber; a heat transfer partition in said chamber to afford two sub-chambers, one within the other and both extending parallel to each other; means connecting the exit end of the inner sub-chamber to the entrance end of the outer sub-chamber, means for blowing dry air into the entrance end of the inner sub-chamber which is returned in the opposite direction through the outer one of said sub-chambers; a heat source near the exit end of said inner sub-chamber for establishing a temperature gradient between the exit and entrance ends of said inner sub-chamber; and means for permitting moist material to be dried to be placed into and as dry material be removed from the inner one of said sub-chambers; said partition being constructed of thin high heat conduction material so as to serve as a heat transfer partition to permit part of the heat of condensation of the moist air blown off the moist material and into the outer sub-chamber to be conducted through the thin partition into the dry air blown into the inner one of said sub-chambers.

2. A dryer as claimed in claim 1; in which the partition is so shaped that the air returns to the end where it originally entered and flows in a helical path adjacent the inner sub-chamber.

3. A dryer as claimed in claim 1; supplemented by means for continuously moving the material to be dried into and out of said inner sub-chamber in the same direction as the air flow in said inner sub-chamber.

4. A dryer as claimed in claim 1; wherein the main chamber is of cylindrical shape and supplemented by means for rotating said main chamber about an axis of rotation.

5. A dryer as claimed in claim 1; wherein the main chamber is of cylindrical shape and supplemented by a hollow stub-shaft coaxial with the axis of said main chamber; a bearing for supporting said stub-shaft; and means for blowing dry air through said stub-shaft into the inner sub-chamber.

6. A dryer as claimed in claim 1; wherein the main chamber is of cylindrical shape supplemented by a hollow stub-shaft coaxial with the axis of said main chamber; a bearing for supporting said stub-shaft; and means for rotating said main chamber through the medium of said stub-shaft.

7. A dryer as claimed in claim 1; wherein the main chamber is of cylindrical shape; and supplemented by a hollow stub-shaft coaxial with the axis of said main chamber; a bearing for supporting said stub-shaft; means for rotating said main chamber through the medium of said stub-shaft; means for blowing dry air through said stub-shaft and into said inner sub-chamber; and means for heating said inner sub-chamber at the end opposite said stub-shaft.

8. A dryer as claimed in claim 1; wherein the main chamber is of cylindrical shape; a hollow shaft coaxial with the axis of said main chamber; a bearing for supporting said shaft; and means for heating said hollow shaft including a burner for injecting a flame into said hollow shaft.

9. A dryer as claimed in claim 1; wherein the partition is of a construction to cause the moist air as it is returned through the medium of the outer sub-chamber to flow in helical paths, means for rotating the main chamber about the axis of said helical path in a direction to cause the water condensate in the outer sub-chamber to be moved in said opposite direction in said outer sub-chamber.

10. A dryer as claimed in claim 1; supplemented by means for rotating said main chamber about its axis.

11. A dryer as claimed in claim 1; wherein the partition is of a construction to cause the return moist air flow through the outer sub-chamber to flow in a helical manner about the axis of said main chamber; and means to rotate said main chamber about said axis.

12. A dryer as claimed in claim 1; wherein the main chamber constitutes a cylindrical inner sub-chamber surrounded by a sub-chamber having a helical outer wall.

13. A dryer as claimed in claim 1; wherein the main chamber constitutes a cylindrical inner sub-chamber surrounded by an outer sub-chamber having a cylindrical outer wall; supplemented by a hollow stub-shaft; means for blowing air into said inner sub-chamber through said stub-shaft; means for rotating said stub-shaft and main chamber; and means for heating the end of said inner sub-chamber at the end opposite to said stub-shaft.

14. A dryer as claimed in claim 1; wherein the main chamber is of cylindrical shape; and wherein the heat transfer partition is a helically grooved cylindrical partition in said main chamber to form an inner sub-chamber and a helical outer sub-chamber having its one end leading to atmosphere and having the other end connected to said inner sub-chamber; means for allowing moist material to be dried to be placed in said inner sub-chamber; means for blowing air into said one end of said inner sub-chamber; means for heating said other end of said inner sub-chamber; the construction being such that the moist heated air flowing in a helical path through said outer sub-chamber condenses and causes the heat of condensation to flow through said partition and into the material to be dried in said inner sub-chamber.

15. A dryer as claimed in claim 1; wherein the main chamber is of cylindrical shape; and wherein the heat transfer partition is a helically grooved cylindrical partition in said main chamber to form an inner sub-chamber of barrel shape and an outer sub-chamber of helical shape and having one end of the helical path through said outer sub-chamber leading to atmosphere and having the other end leading into the inner sub-chamber; means for continuously moving material to be dried into said one end of said inner sub-chamber and out of the other end; means for blowing air into said one end of said inner sub-chamber and out of the other end and into said outer sub-chamber; and means for heating that end of the inner sub-chamber where it joins the outer sub-chamber.

16. A dryer as claimed in claim 1; wherein the main chamber is of cylindrical shape; and wherein the heat transfer partition is a helically grooved cylindrical partition in said main chamber to form an inner sub-chamber of barrel shape and an outer sub-chamber of helical shape and having one end of the helical path through said outer sub-chamber leading to atmosphere and having the other end leading from the inner sub-chamber; means for continuously moving material to be dried into said one end of said inner sub-chamber and out of the other end; means for blowing air into said one end of said inner sub-chamber and out of the other end thereof and into said outer sub-chamber; means for rotating said main chamber about its axis of rotation; and means for heating that end of the inner sub-chamber where it joins the outer sub-chamber.

17. A dryer comprising; a drum; a partition for dividing said drum longitudinally into an interior air-flow and drying chamber and an external coaxial air-return passage-way, the partition between the air-flow and drying chamber and the air-return passage-way being constructed of thin heat conducting material; means for blowing air into the air-flow and drying chamber at the first end of the drum; means for heating the air and contents of the air-flow and drying chamber at the second end of the drum; means for causing the passage of air from the air-flow and drying chamber at the second end of the drum into the air-passage-way at that end; means for allowing the air and accumulated condensate but not the contents of the air flow and drying chamber to leave the air-passage-way at the first end of the drum; means for allowing the introduction and removal of material to be dried into the drying portion of the air-flow and drying chamber; and mechanical means for pivotally supporting the drum about its axis.

18. A dryer as claimed in claim 17, supplemented by means for rotating said drum.

19. A dryer as claimed in claim 17, supplemented by means for rotating said drum; the return passage-way of said drum being helically corrugated in a direction relative to the direction of rotation of said drum that water condensate in said return passage-way will be propelled toward said first end by such rotation of the drum.

20. A dryer as claimed in claim 17; wherein the partition is of helical construction to form helical parallel paths for air flow in opposite directions about the axis of said drum and in opposite linear directions between said first and said second end.

21. A dryer as claimed in claim 17; wherein the partition is of helical construction to form helical parallel paths; means for rotating the drum; the helical paths causing air to flow in opposite directions but the rotation of the drum causing water in both helical paths to flow only from said second end toward said first end.

22. A dryer comprising; a drum; a partition for dividing said drum longitudinally into an interior drying chamber coaxial with the drum and an external air-return passage-way coaxial with the drying chamber; the said partition between the drying chamber and the air-return passage-way being constructed of thin heat conducting material; means for introducing air into the drying chamber at the first end of the drum; means for allowing the passage of air from the drying chamber into the air-return passage-way at the second end of the drum; means for allowing the air to leave the air-return passage-way at the first end of the drum; means for allowing the introduction of material to be dried into the drying chamber; means for rotating the drum; and means for heating the drum at the second end in order to produce a pronounced temperature gradient along the length of the drum, the second end being hotter than the first in both the drying chamber and the air-return passageway but the average temperature in the air-return passage-way being higher than the average temperature in the drying chamber, to produce a gradient temperature-difference through most of the length of the drum, said temperature gradient causing a cooling of the moist return air and a condensation of the moisture from this air as it passes from the hot to the cool end of the return-air passage-way, the heat released from the moist air by both conduction and condensation passing through said thin heat conducting partition into the cooler drying chamber and causing the evaporation of moisture therein so that the same heat will evaporate moisture a plurality of times.

23. A dryer as claimed in claim 22; wherein the partition is constructed to form helical air passages in multiple, separated by said partition so as to increase the heat conducting area of said partition.

24. A dryer as claimed in claim 22; wherein the partition is constructed to form helical air pasages in multiple separated by said partition so as to increase the heat conducting area of said partition, and wherein the helical pitch is in a direction relative to the direction of rotation of said drum that water contained in either of the helical air passages will be propelled in a direction toward said first end of said drum by such rotation.

25. A dryer apparatus comprising, a chamber formed of high heat transmission material for containing moist material to be dried, means for introducing the moist material to be dried into said chamber and removing dried material from said chamber, means at or near one end of said chamber for impelling air through said chamber and over or through the material to be dried, a heat source at or near the other end of said chamber for establishing a temperature gradient along said chamber, means connected at or near said other end of said chamber for receiving the air impelled through said chamber and moisture removed from said material but not said material and transmitting said air and moisture toward said one end of said chamber over a path adjacent said chamber so that said moisture condenses and imparts its heat of condensation to said chamber, and means connected to said air and moisture transmitting means near said one end of said chamber for removing said condensation.

References Cited in the file of this patent

UNITED STATES PATENTS

| | | |
|---|---|---|
| 1,358,313 | Hero | Nov. 9, 1920 |
| 2,162,973 | Roland | June 20, 1939 |
| 2,825,980 | Herrick et al. | Mar. 11, 1958 |

FOREIGN PATENTS

| | | |
|---|---|---|
| 882,078 | France | May 17, 1943 |